United States Patent [19]

Ruzicka

[11] Patent Number: 4,623,300

[45] Date of Patent: Nov. 18, 1986

[54] HELICOPTER ROTOR BLADE SECUREMENT DEVICE

[75] Inventor: Harry L. Ruzicka, Easton, Conn.

[73] Assignee: United Technologies Corporation, Hartford, Conn.

[21] Appl. No.: 777,799

[22] Filed: Sep. 19, 1985

[51] Int. Cl.⁴ .............................................. B64C 27/50
[52] U.S. Cl. ..................................... 416/143; 244/7 A
[58] Field of Search ............... 416/143, 142; 244/7 R, 244/7 A

[56] References Cited

U.S. PATENT DOCUMENTS

| | | | |
|---|---|---|---|
| 2,110,443 | 3/1938 | Larsen et al. | 416/143 X |
| 2,220,109 | 11/1940 | Larsen | 416/143 |
| 2,405,777 | 8/1946 | Buivid | 416/143 |
| 2,538,082 | 1/1951 | Buivid | 416/142 X |
| 2,549,886 | 4/1951 | Buivid | 416/142 X |
| 2,679,364 | 5/1954 | Pesaro | 244/7 A |
| 2,981,339 | 4/1961 | Kaplan | 416/142 |
| 3,112,088 | 11/1963 | Speechley | 416/143 X |
| 3,133,715 | 5/1964 | Grunfelder | 416/143 X |
| 4,268,222 | 5/1981 | Bernard | 416/143 X |

FOREIGN PATENT DOCUMENTS

| | | | |
|---|---|---|---|
| 692283 | 8/1964 | Canada | 244/7 R |
| 419780 | 4/1947 | Italy | 416/146 R |
| 536904 | 5/1941 | United Kingdom | 416/142 |
| 567756 | 3/1945 | United Kingdom | 416/148 |
| 1091401 | 11/1967 | United Kingdom | 416/142 |
| 1318864 | 5/1973 | United Kingdom | 416/142 |

Primary Examiner—Everette A. Powell, Jr.
Attorney, Agent, or Firm—Gerald E. Linden

[57] ABSTRACT

Folded helicopter blades are secured against undesirable motion by a device that attaches to a receptacle in the underside of each blade. The device comprises a pin for engaging the receptacle, a spherical bearing disposed about the pin, an annular housing disposed about the bearing and including two diametrically opposed recesses therein, a primary strut attached at one end to the fuselage and at the other end to a clevis-type yoke, wherein the yoke ends are pivotally attached to the housing within the recesses, a secondary strut attached at one end to the fuselage and attached at the other end to the primary strut near the yoke. This arrangement forms a three bar linkage.

4 Claims, 2 Drawing Figures

HELICOPTER ROTOR BLADE SECUREMENT DEVICE

BACKGROUND OF THE INVENTION

Helicopter rotor blades are often designed to fold toward the tail section of the aircraft for storage. In their folded position, motions such as flapwise, edgewise and/or pitching motions, due to wind conditions must be limited to prevent contact with the other blades, or with the fuselage. Therefore, it is known to provide a securement device to hold the folded blades in place.

DISCLOSURE OF THE INVENTION

It is an object of this invention to provide an improved blade securement device with improved fatigue strength, and thus higher reliability.

Another object of the invention is to provide a securement device that is forgiving of all blade motions due to wind loading, yet has the ability to react such loads via struts to the fuselage.

According to the invention folded helicopter blades are secured against undesirable motion by a device that attaches to a receptacle in the underside of each blade. The device comprises a pin for engaging the receptacle, a spherical bearing disposed about the pin, an annular housing disposed about the bearing and including two diametrically opposed recesses therein, a primary strut attached at one end to the fuselage and at the other end to a clevis-type yoke, wherein the yoke ends are pivotally attached to the housing within the recesses, a secondary strut attached at one end to the fuselage and attached at the other end to the primary strut near the housing.

Other objects, features, and advantages of the invention will become apparent in light of the following description thereof.

BEST MODE FOR CARRYING OUT THE INVENTION

Figure 1:
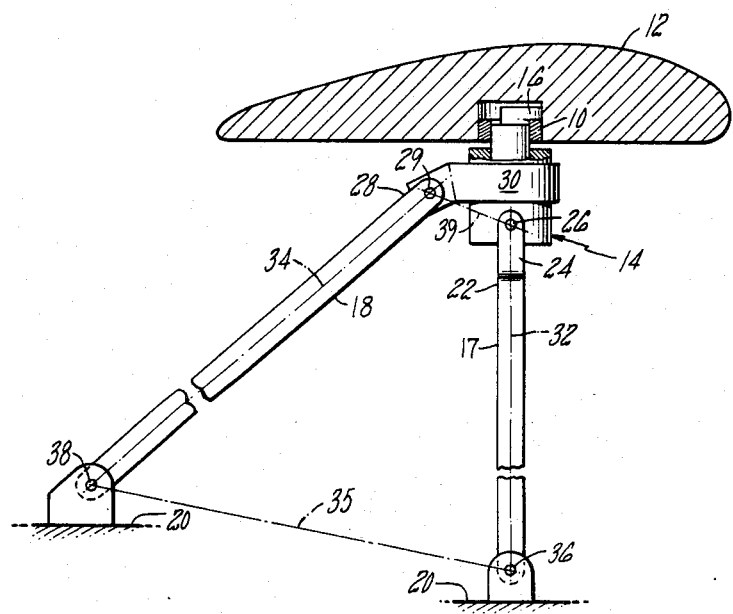
FIG. 1 is a side view of a prior art blade securement device.

FIG. 1 shows a prior art blade securement device. A receptacle 10 is provided in the underside of a blade 12. A fitting 14 attaches to the blade, via the receptacle, when the blade is folded for storage. The fitting 14 comprises a hook-type plunger with a rotatable cam 16 for securing the fitting to the blade.

Two struts, a primary strut 17 and a secondary strut 18, extend between the fitting 14 and the fuselage 20 to hold the folded blade in place. The fitting end 22 of the primary strut terminates in a yoke 24 that is pivotally attached via pins 26 to diametrically opposed sides of the fitting. The fitting end 28 of the secondary strut 18 is pivotally attached via a pin 29 to a bracket 30 that is journalled to the fitting 14 in a manner to allow for rotation thereabout in a plane parallel to the undersurface of the blade 12. The struts 17 and 18 are pivotally attached by suitable means 36 and 38, respectively, to the fuselage 20. The longitudinal axes 32 and 34 of the struts, the baseline 35 between their fuselage attachment points 36 and 38, and the offset 39 between the pins 26 and the pin 29 forms a "four-bar" linkage. Therefore, wind-induced blade motion will tend to elongate and/or foreshorten the struts and will cause adverse bending stresses on the fitting and/or the receptacle.

Figure 2:
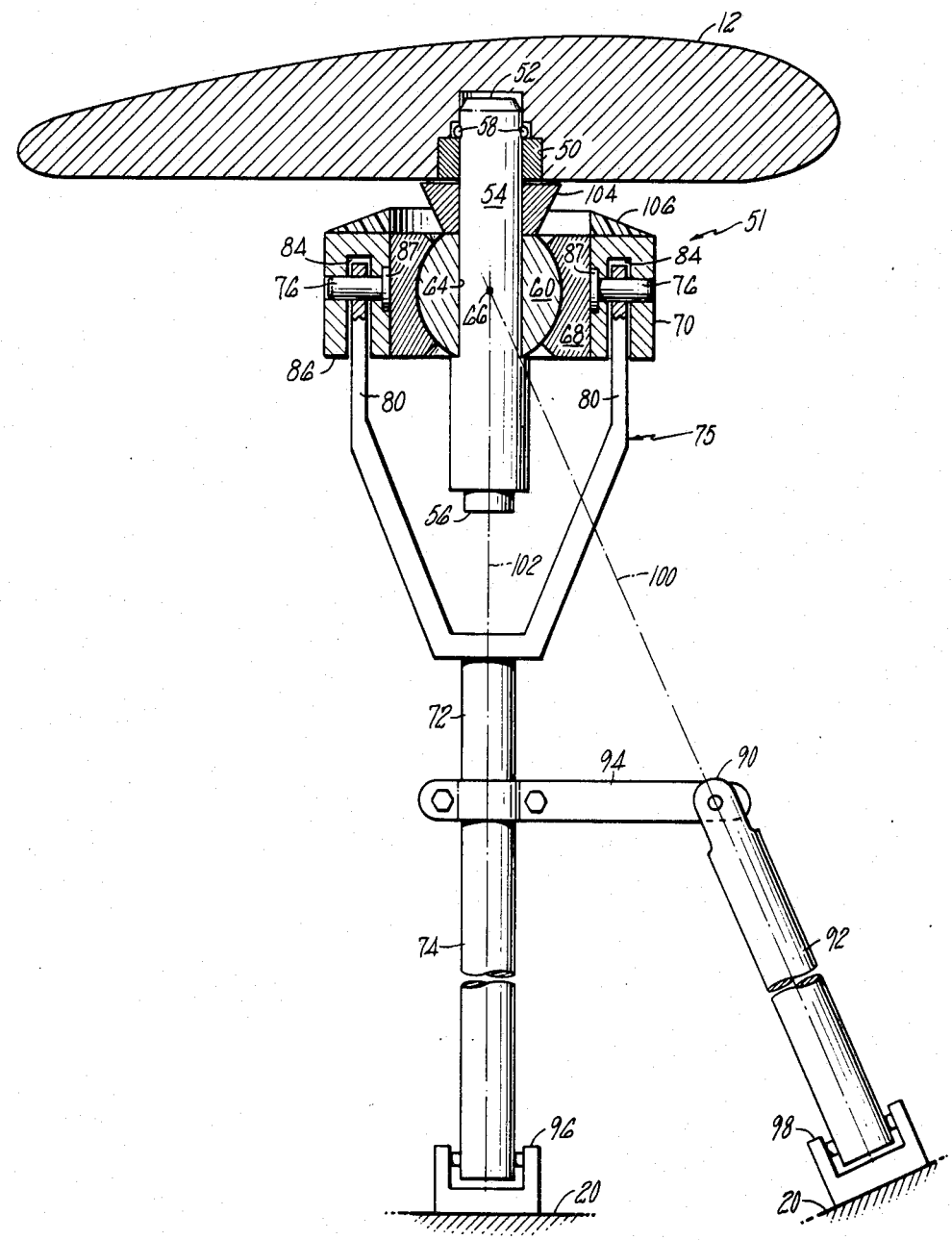
FIG. 2 is a side view of the blade securement device of this invention.

FIG. 2 shows the blade securement device of this invention. A cylindrical receptacle 50 is provided in the underside of the blade 12. A fitting 51 attaches to the blade, via the receptacle, when the blade is folded for storage. A quick release pin 52 comprising a tubular body member 54, a spring loaded axial plunger 56 and four balls 58 is insertable into the fitting, generally perpendicular to the underside of the blade, so that the balls secure the pin 52 to the receptacle 50, as shown.

A spherical bearing 60 is disposed about the pin 52. The bore of the spherical bearing is designated by the reference numeral 64, its center of rotation is designated by the reference numeral 66, and its outer race is designated by the reference numeral 68. An annular housing 70 retains the outer race 68 of the spherical bearing, and is coaxial with the pin 52.

The fitting end 72 of a primary strut 74 terminates in a clevis-like yoke 75 that is pivotally attached via diametrically opposed pins 76 to the housing 70. It will be noted that the pivot axis of the pins 76 is generally parallel to the underside of the blade, and perpendicular to the primary strut. In a preferred embodiment of the invention, the yoke ends 80 fit within recesses 84 provided in the underside 86 of the housing so that the pins 76 are in double shear. The pins 76 have shoulders 87 so that they may be retained in the housing by the outer bearing race 68. The recesses 84 are sized so as to allow for up to ±60 degrees of pivotal motion of the housing with respect to the yoke.

The fitting end 90 of a secondary strut 92 is attached via a clamp 94 along the length of the primary strut 74 near the yoke 75. The struts 74 and 92 are pivotally attached by suitable means 96 and 98, respectively, to the fuselage 20.

It will be noted that the longitudinal axes 100, 102 of the struts 74 and 92 intersect at the center of rotation 66 of the spherical bearing 60. This forms a "three-bar" rigid inplane linkage, which is quite superior for this application to the four bar linkage of the prior art.

The blade securement assembly essentially allows for 15° conical undulation of the rotor blade, with respect to the fuselage. Thus, all motion relating to flapwise bending and/or pitch are accommodated by the spherical bearing and the primary yoke. Blade edgewise motion is restricted by the clamped secondary strut. As a result, the securement device of this invention experiences far lower bending stress and therefore exhibits improved fatigue life and reliability than the securement device of the prior art.

The blade securement device is installed by depressing the plunger 56 of the pin 52, permitting engagement with the receptacle 50 embedded within the lower surface of the rotor blade 12. Pulling the plunger 56 releases the balls and consequently the device is released. An additional conical or cylindrical bushing 104 is disposed about the pin 52 above the spherical bearing to provide a bearing surface between the blade 12 and the bearing 60. Additionally an annular teflon or nylon cap 106 is disposed about the upper surface of the housing to protect the blade from damaging contact with the blade securement device.

It is apparent by examination of the hook-plunger mechanism of FIG. 1 that its unsupported edge or side makes the securement device susceptible to being dislodged from the cylindrical receptacle 10. This may occur, for instance, from bending moments generated by blade flexure or the "four-bar linkage effect" mentioned hereinbefore, are directed opposite the hooked or shouldered side. The four-ball pin, used in this invention, reacts bending and axial loads equally as well on all sides therefore provides further reliability.

I claim:

1. A device for securing the folded blades of a helicopter to the fuselage comprising, for each blade:
   a receptacle installed in the underside of the blade;
   attachment means for engaging the receptacle;
   a spherical bearing disposed about the attachment means;
   an annular housing disposed about the bearing;
   a clevis-type yoke having two ends pivotally attached to the housing;
   a primary strut attached at one end to the fuselage and at the other end to the clevis-type yoke;
   a secondary strut attached at one end to the fuselage and attached at the other end to the primary strut near the yoke.

2. A device according to claim 1 wherein:
   the housing inculdes two diametrically opposed recesses in its underside; and
   wherein the yoke ends are pinned to the housing within the recesses.

3. A device according to claim 1 wherein the longitudinal axes of the struts generally intersect at the centerpoint of the spherical bearing.

4. A device according to claim 1 wherein the attachment means is a four-ball quick-release pin.

* * * * *